(12) United States Patent
Cavette

(10) Patent No.: US 12,457,996 B1
(45) Date of Patent: Nov. 4, 2025

(54) PET COLLAR WITH POTTY-SENSING CAPABILITY

(71) Applicant: Jerry Cavette, Flint, MI (US)

(72) Inventor: Jerry Cavette, Flint, MI (US)

( * ) Notice: Subject to any disclaimer, the term of this patent is extended or adjusted under 35 U.S.C. 154(b) by 182 days.

(21) Appl. No.: 18/528,971

(22) Filed: Dec. 5, 2023

(51) Int. Cl.
*A01K 29/00* (2006.01)
*A01K 27/00* (2006.01)

(52) U.S. Cl.
CPC .......... *A01K 29/005* (2013.01); *A01K 27/001* (2013.01)

(58) Field of Classification Search
CPC .............................. A01K 29/005; A01K 27/001
USPC ....................................................... 340/573.3
See application file for complete search history.

(56) References Cited

U.S. PATENT DOCUMENTS

| | | | |
|---|---|---|---|
| 8,305,220 B2 | 11/2012 | Gibson | |
| 9,615,547 B2* | 4/2017 | Menkes | ................ A61B 5/1118 |
| 9,883,656 B1* | 2/2018 | Turner | ................ A01K 27/002 |
| D822,915 S | 7/2018 | McKee | |
| 10,492,473 B2* | 12/2019 | Menkes | ............... A01K 29/005 |
| 2008/0084316 A1* | 4/2008 | Panton | ................... A01K 23/00 |
| | | | 340/573.3 |
| 2011/0193706 A1 | 8/2011 | Dickerson | |
| 2018/0012477 A1* | 1/2018 | Lewis | ........................ E06B 7/28 |
| 2022/0104464 A1* | 4/2022 | Wernimont | .......... A61B 5/7267 |
| 2022/0159929 A1* | 5/2022 | Hung | ................... A01K 27/009 |
| 2024/0032510 A1* | 2/2024 | Abraham | ............. A01K 29/005 |

FOREIGN PATENT DOCUMENTS

WO 2022072049 4/2022

* cited by examiner

*Primary Examiner* — Eric Blount
(74) *Attorney, Agent, or Firm* — Kyle A. Fletcher, Esq.

(57) ABSTRACT

The pet collar with potty-sensing capability is adapted for use by a companion animal. The pet collar with potty-sensing capability is worn by the companion animal. The pet collar with potty-sensing capability detects the heart rate of the companion animal. The pet collar with potty-sensing capability detects the electric activity of the nervous system associated with the detrusor muscle of the companion animal. The pet collar with potty-sensing capability identifies known correlations between: a) the heart rate of the companion animal; b) the electric activity associated with the detrusor muscle; and, c) the urgency of the need of the companion animal to urinate. The pet collar with potty-sensing capability generates an alarm condition to indicate that the companion animal needs to urinate.

13 Claims, 5 Drawing Sheets

PET COLLAR WITH POTTY-SENSING CAPABILITY

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of monitoring or measuring activity of an animal. (A01K29/005)

SUMMARY OF INVENTION

The pet collar with potty-sensing capability is adapted for use by a companion animal. The pet collar with potty-sensing capability is worn by the companion animal. The pet collar with potty-sensing capability detects the heart rate of the companion animal. The pet collar with potty-sensing capability detects the electric activity of the nervous system associated with the detrusor muscle of the companion animal. The pet collar with potty-sensing capability identifies known correlations between: a) the heart rate of the companion animal; b) the electric activity associated with the detrusor muscle; and, c) the urgency of the need of the companion animal to urinate. The pet collar with potty-sensing capability generates an alarm condition to indicate that the companion animal needs to urinate. In response to the alarm condition, the pet collar with potty-sensing capability will: a) generate a visible alarm on the animal; and, b) transmit a messaging facility to an appropriate authority with an alarm message.

These together with additional objects, features and advantages of the pet collar with potty-sensing capability will be readily apparent to those of ordinary skill in the art upon reading the following detailed description of the presently preferred, but nonetheless illustrative, embodiments when taken in conjunction with the accompanying drawings.

In this respect, before explaining the current embodiments of the pet collar with potty-sensing capability in detail, it is to be understood that the pet collar with potty-sensing capability is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the pet collar with potty-sensing capability.

It is therefore important that the claims be regarded as including such equivalent construction insofar as they do not depart from the spirit and scope of the pet collar with potty-sensing capability. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
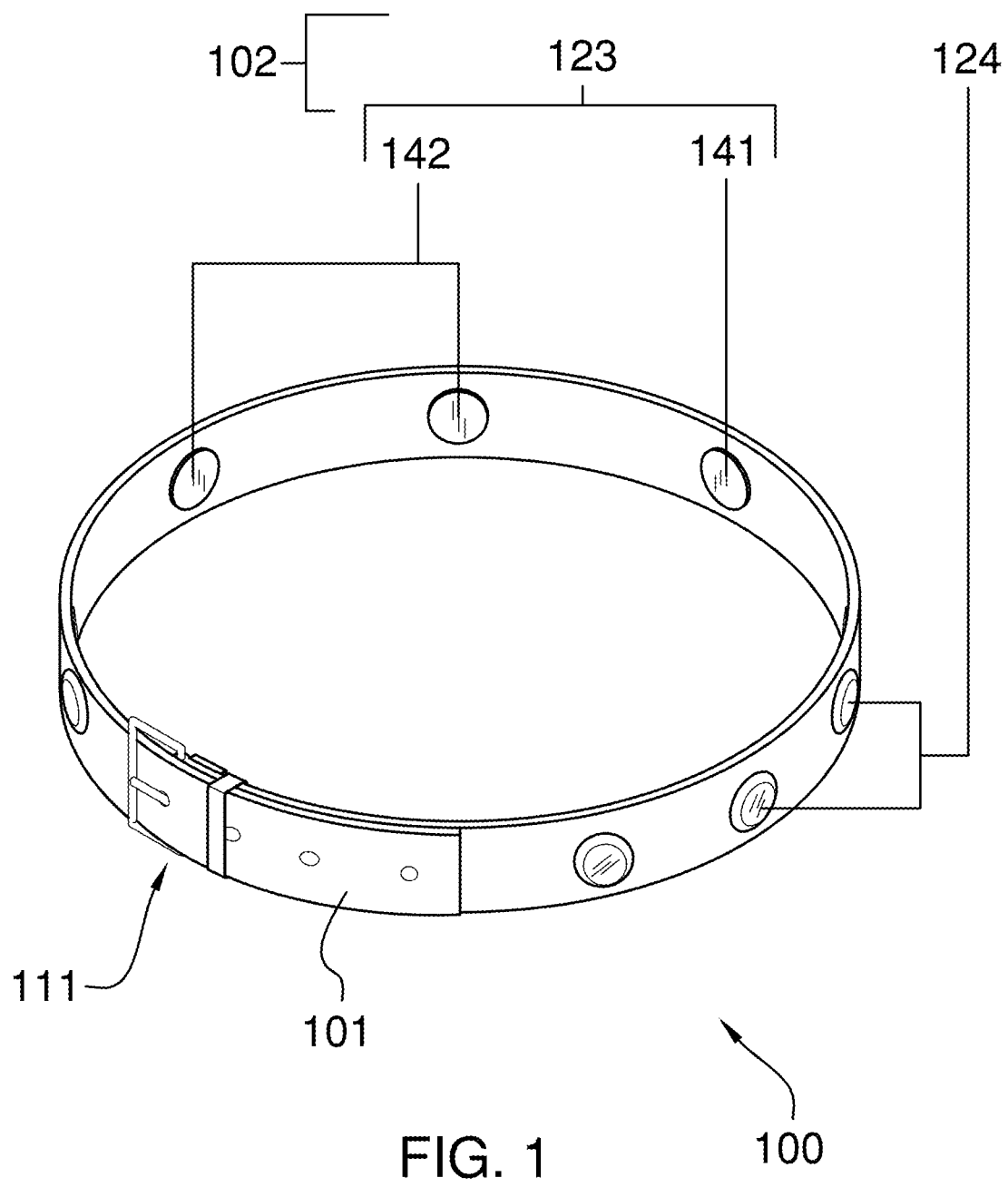
FIG. 1 is a perspective view of an embodiment of the disclosure.
Figure 2:
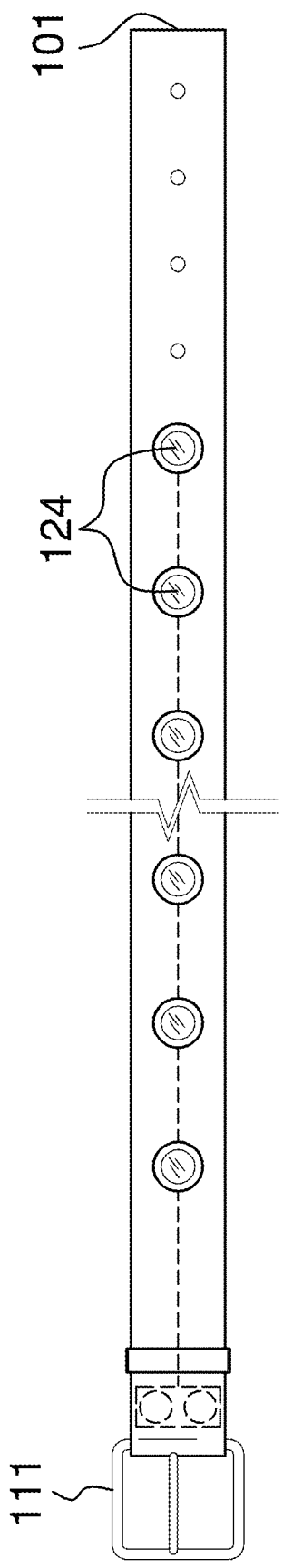
FIG. 2 is an exterior view of an embodiment of the disclosure.
Figure 3:
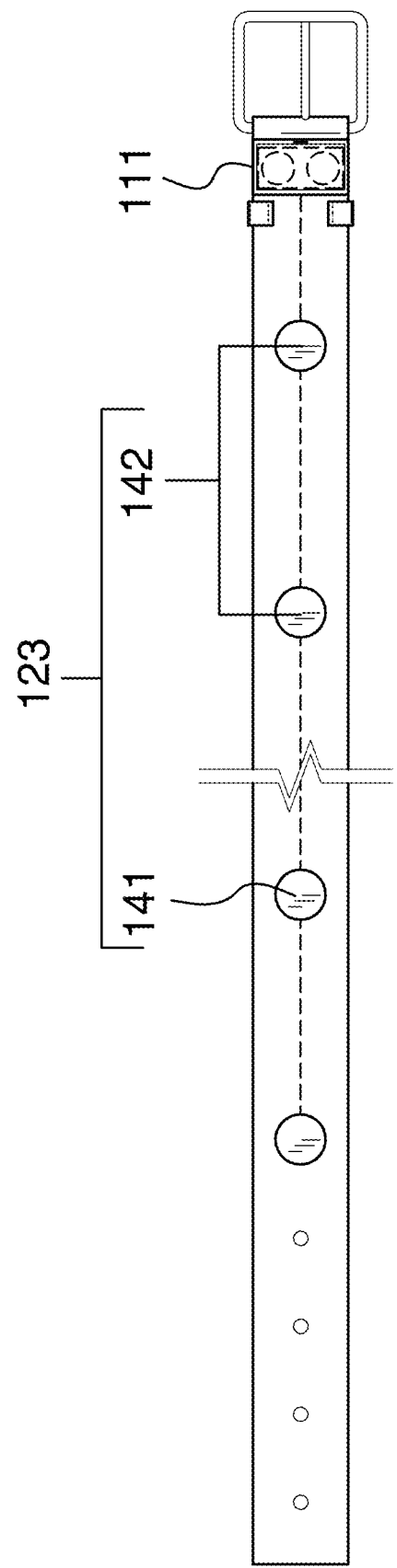
FIG. 3 is an interior view of an embodiment of the disclosure.
Figure 4:
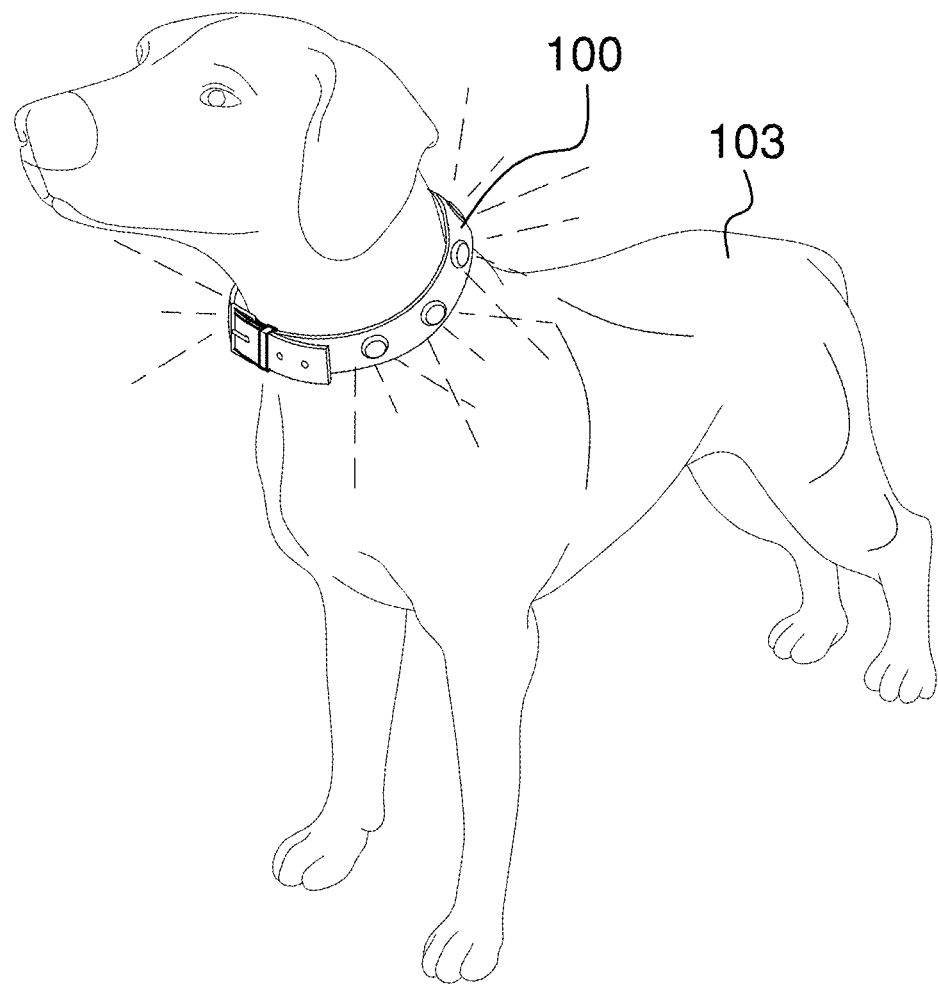
FIG. 4 is an in-use view of an embodiment of the disclosure.
Figure 5:
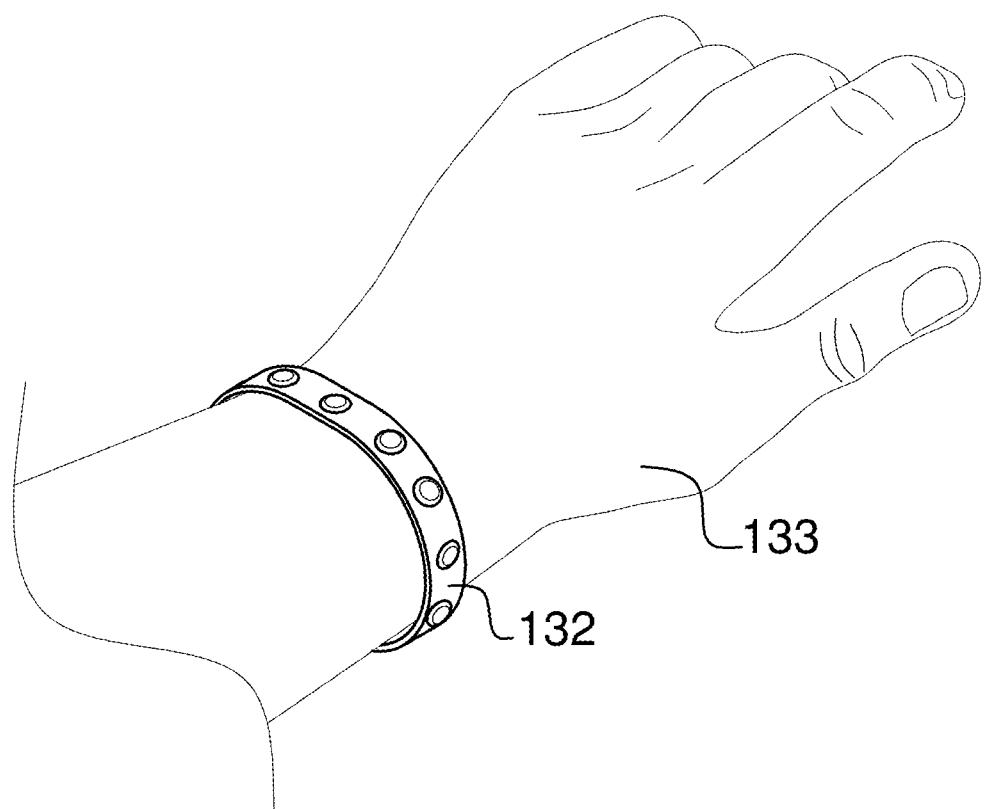
FIG. 5 is an in-use view of an embodiment of the disclosure.
Figure 6:
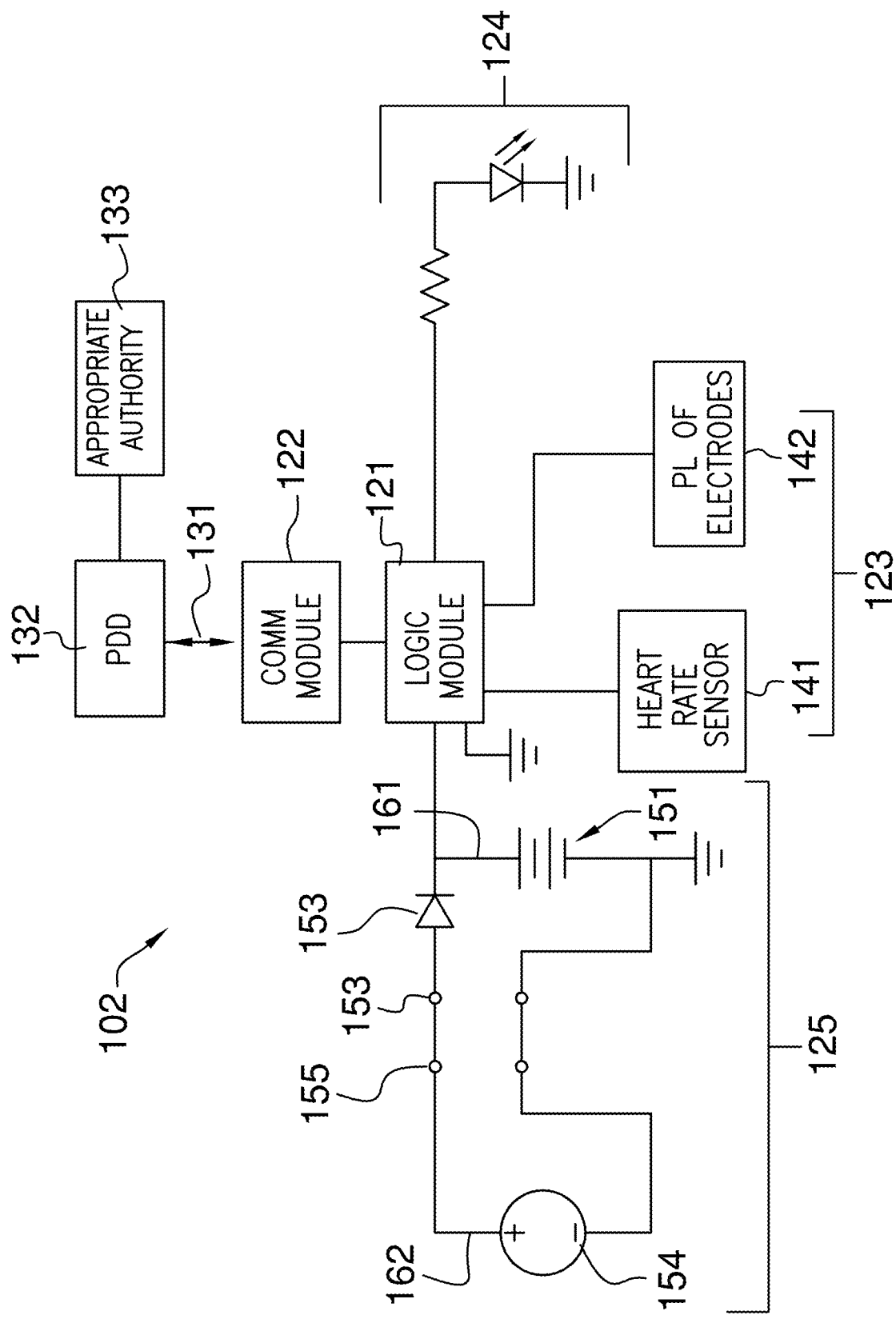
FIG. 6 is a schematic view of an embodiment of the disclosure.

Detailed reference will now be made to one or more potential embodiments of the disclosure, which are illustrated in FIGS. 1 through 6.

The pet collar with potty-sensing capability 100 (hereinafter invention) is adapted for use by a companion animal 103. The invention 100 is worn by the companion animal 103. The invention 100 detects the heart rate of the companion animal 103. The invention 100 detects the electric activity of the nervous system associated with the detrusor muscle of the companion animal 103. The invention 100 identifies known correlations between: a) the heart rate of the companion animal 103; b) the electric activity associated with the detrusor muscle; and, c) the urgency of the need of the companion animal 103 to urinate. The invention 100 generates an alarm condition to indicate that the companion animal 103 needs to urinate. In response to the alarm condition, the invention 100 will: a) generate a visible alarm on the animal; and, b) transmit a messaging facility to an appropriate authority 133 with an alarm message. The invention 100 comprises a collar 101 and a control circuit 102. The control circuit 102 mounts in the collar 101. The companion animal 103 is defined elsewhere in this disclosure.

The collar 101 is a strap. The collar 101 is worn as a collar 101 by the companion animal 103. The control circuit 102 mounts in the collar 101. The collar 101 further comprises a buckle 111. The buckle 111 is a fastening device. The buckle 111 secures the collar 101 to itself to form a loop. The buckle 111 secures the collar 101 to the neck of the companion animal 103. The buckle 111 is formed with a negative space. The negative space of the buckle 111 forms a protected space that houses the control circuit 102.

The control circuit 102 is an electric circuit. The control circuit 102 controls the operation of the invention 100. The control circuit 102 measures the heart rate of the companion animal 103. The control circuit 102 measures the electric activity of the nervous system associated with the detrusor muscle of the companion animal 103. The control circuit 102 monitors the measured heart rate and the measured electric activity to identify and determine the urgency of the need of the companion animal 103 to urinate. The control circuit 102 generates a visual alarm when the control circuit 102 determines that the companion animal 103 needs to urinate. The control circuit 102 transmits a messaging facility containing an alarm message to an appropriate authority 133 when the control circuit 102 determines that the companion animal 103 needs to urinate. The control circuit 102 is an independently powered electric circuit. By independently powered is meant that the control circuit 102 can operate without an electrical connection to an external power source 154.

The control circuit 102 comprises a logic module 121, a communication module 122, a plurality of sensors 123, a lamp circuit 124, and a power circuit 125. The logic module 121, the communication module 122, the plurality of sensors 123, the lamp circuit 124, and the power circuit 125 are electrically interconnected.

The logic module 121 is a programmable electronic device that is used to manage, regulate, and operate the control circuit 102. The communication module 122 is a wireless electronic communication device that allows the logic module 121 to wirelessly communicate with a personal data device 132. The communication module 122 further comprises a first wireless communication link 131 and the personal data device 132. The communication module 122 forms the first wireless communication link 131 with the personal data device 132. The communication module 122 exchanges one or more direct messaging facilities that are transmitted over the first wireless communication link 131 to the personal data device 132. The message contained in the direct messaging facility contains an alarm message intended to inform an appropriate authority 133 that the companion animal needs to urinate.

The personal data device 132 is a programmable electrical device. The personal data device 132 provides data management and communication services through one or more functions referred to as an application. The application is an algorithm implemented by the personal data device 132. The application of the personal data device 132 forms an interface between the appropriate authority 133 and the control circuit 102. The personal data device 132 receives one or more messaging facilities from the control circuit 102 over the first wireless communication link 131. The personal data device 132 transmits the contents of the messaging facility to the appropriate authority 133.

The logic module 121 electrically connects to each sensor selected from the plurality of sensors 123. The logic module 121 monitors and analyzes the heart rate data and the electrical activity data collected by the plurality of sensors 123. The logic module 121 performs the analysis of the collected data to determine whether the companion animal 103 needs to urinate. The logic module 121 electrically connects to the lamp circuit 124. The logic module 121 controls the operation of the lamp circuit 124. The logic module 121 illuminates the lamp circuit 124 when the logic module 121 determines that the companion animal 103 needs to urinate.

Each senor selected from the plurality of sensors 123 measures a biological process selected from the group consisting of: a) the heart rate of the companion animal 103; and, b) the action potentials that form the electric activity of the nervous system associated with the detrusor muscle of the companion animal 103. The plurality of sensors 123 transmits the measured heart rate information to the logic module 121. The plurality of sensors 123 transmits the measured electrical activity information to the logic module 121. The plurality of sensors 123 mounts on the interior face of the collar 101 such that each sensor selected from the plurality of sensors 123 is in contact with the skin of the companion animal 103. The plurality of sensors 123 comprises a heart rate sensor 141 and a plurality of electrodes 142.

The heart rate sensor 141 is a heart sensor. The heart rate sensor 141 detects and measures the heart rate of the companion animal 103. The heart rate sensor 141 converts the measured heart rate into an electric signal. The heart rate sensor 141 transmits the electric signal to the logic module 121 for further processing.

The plurality of electrodes 142 is formed from a collection of individual electrodes. The plurality of electrodes 142 measure the action potentials that form the electric activity of the nervous system associated with the detrusor muscle of the companion animal 103. The plurality of electrodes 142 converts the measured action potentials into an electric signal. The plurality of electrodes 142 transmits the electric signal to the logic module 121 for further processing.

The lamp circuit 124 is an electric circuit. The lamp circuit 124 converts electric energy into electromagnetic radiation. The lamp circuit 124 mounts on the exterior face of the collar 101 such that the electromagnetic radiation generated by the lamp circuit 124 is visible from the environment. The lamp circuit 124 electrically connects to the logic module 121. The logic module 121 illuminates the lamp circuit 124 when the logic module 121 determines that the companion animal 103 needs to urinate.

The power circuit 125 is an electrical circuit. The power circuit 125 powers the operation of the control circuit 102. The power circuit 125 is an electrochemical device. The power circuit 125 converts chemical potential energy into the electrical energy required to power the control circuit 102. The power circuit 125 comprises a battery 151, a diode 152, a charging port 153, and an external power source 154. The battery 151 further comprises a first positive terminal 161. The external power source 154 further comprises a charging plug 155 and a second positive terminal 162. The battery 151, the diode 152, the charging port 153, the external power source 154, and the charging plug 155 are electrically interconnected.

The battery 151 is an electrochemical device. The battery 151 converts chemical potential energy into the electrical energy used to power the control circuit 102. The battery 151 is a commercially available rechargeable battery 151. The chemical energy stored within the rechargeable battery 151 is renewed and restored through use of the charging port 153. The charging port 153 is an electrical circuit that reverses the polarity of the rechargeable battery 151 and provides the energy necessary to reverse the chemical processes that the rechargeable battery 151 initially used to generate the electrical energy. This reversal of the chemical process creates a chemical potential energy that will later be used by the rechargeable battery 151 to generate electricity.

The charging port 153 forms an electrical connection to an external power source 154 using a charging plug 155. The charging plug 155 forms a detachable electrical connection with the charging port 153. The charging port 153 receives electrical energy from the external power source 154 through the charging plug 155. The diode 152 is an electrical device that allows current to flow in only one direction. The diode 152 installs between the rechargeable battery 151 and the charging port 153 such that electricity will not flow from the first positive terminal 161 of the rechargeable battery 151 into the second positive terminal 162 of the external power source 154. In the first potential embodiment of the disclosure, the external power source 154, the charging plug 155, and the charging port 153 are compatible with USB power requirements.

The following definitions were used in this disclosure:

Action Potential: As used in this disclosure, an action potential is a biological term that refers to the transfer of electric energy between a first nerve cell to a second nerve cell or between a nerve cell and a muscle cell.

Animal: As used in this disclosure, an animal is a biological organism that consumes organic material as its primary energy source for metabolism, requires oxygen for its primary metabolic processes, reproduces sexually, and forms tissues. Always use metabolism and tissue Appropriate Authority: As used in this disclosure, an appropriate authority is a previously determined person or organization that is designated to send and receive alarm or other notification messages regarding a monitored system or activity.

Barrier: As used in this disclosure, a barrier is a physical obstacle that forms a boundary between a first space and a second space. The barrier prevents the passage of an object between the first space and the second space.

Battery: As used in this disclosure, a battery is a chemical device consisting of one or more cells, in which chemical energy is converted into electricity and used as a source of power. Batteries are commonly defined with a positive terminal and a negative terminal.

Bluetooth™: As used in this disclosure, Bluetooth™ is a standardized communication protocol that is used to wirelessly interconnect electronic devices.

Buckle: As used in this disclosure, a buckle is a fastening device that is used for joining a first free end of a strap to a second free end of the same strap or a different strap. A buckle further comprises a first (also called the male) connector that is attached to the first free end and a second (also called the female) connector that is attached to the second free end. The male connector has a pin or other structure that is generally caught by a structure formed in the female connector.

Channel: As used in this disclosure, a channel is a previously determined frequency of electromagnetic radiation that is used for wireless communication. Wireless communication structures often designate a plurality of channels which allows users to "change the channel" when a previously specified channel is experiencing some form of interference.

Collar: As used in this disclosure, a collar is a ring like device that is placed around the neck of a companion animal.

Communication Link: As used in this disclosure, a communication link refers to the structured exchange of data between two objects.

Companion Animal: As used in this disclosure, a companion animal is a domesticated animal that is maintained primarily for companionship. A companion animal is often referred to as a pet.

Control Circuit: As used in this disclosure, a control circuit is an electrical circuit that manages and regulates the behavior or operation of a device.

Diode: As used in this disclosure, a diode is a two terminal semiconductor device that allows current flow in only one direction. The two terminals are called the anode and the cathode. Electric current is allowed to pass from the anode to the cathode.

Elimination: As used in this disclosure, an elimination refers to a solid phase discharge from a biological entity.

Excretion: As used in this disclosure, an excretion refers to a liquid phase discharge from a biological entity. The excretion of an animal is also called urine.

External Power Source: As used in this disclosure, an external power source is a source of the energy that is externally provided to enable the operation of the present disclosure. Examples of external power sources include, but are not limited to, electrical power sources and compressed air sources.

Heart Sensor: As used in this disclosure, a heart sensor is a sensor that is worn by a patient. The position of the heart sensor is selected such that the heart sensor can detect and measure the pulse of the patient.

Housing: As used in this disclosure, a housing is a rigid structure that encloses and protects one or more devices.

Lamp: As used in this disclosure, a lamp is an electrical circuit that generates (typically visible spectrum) electromagnetic radiation.

Light: As used in this disclosure, light refers to electromagnetic radiation that illuminates an area. Illumination is a synonym for light, particularly in cases where a measure of the amount of light in a space is called for.

Logic Module: As used in this disclosure, a logic module is a readily and commercially available electrical device that accepts digital and analog inputs, processes the digital and analog inputs according to previously specified logical processes and provides the results of these previously specified logical processes as digital or analog outputs. The disclosure allows, but does not assume, that the logic module is programmable.

Loop: As used in this disclosure, a loop is the length of a first linear structure including, but not limited to, shafts, lines, cords, or webbings, that is: 1) folded over and joined at the ends forming an enclosed space; or, 2) curved to form a closed or nearly closed space within the first linear structure. In both cases, the space formed within the first linear structure is such that a second linear structure such as a line, cord or a hook can be inserted through the space formed within the first linear structure. Within this disclosure, the first linear structure is said to be looped around the second linear structure.

Messaging Facility: As used in this disclosure, a messaging facility is a previously determined formatting structure through which a text or image (referred to in this definition as text) based communication is transmitted for delivery. A messaging facility is selected from the group consisting of a traditional messaging facility, a direct messaging facility and a broadcast messaging facility. A traditional messaging facility includes the delivery of a physical object containing the text based communication. The direct messaging facility includes communications that are addressed to a previously identified group of recipients. The broadcast messaging facility includes communications that are transmitted without the prior identification of the intended group of recipients. An example of a traditional messaging facility includes, but is not limited to, postal delivery. Examples of a direct messaging facilities include, but are not limited to, email, audio based communications, and SMS messages. A social media service is an example of a broadcast messaging facility.

Metabolism: As used in this disclosure, metabolism refers to the chemical processes that occur within a living cell.

PDD: As used in this disclosure, PDD is an acronym for personal data device.

Personal Data Device: As used in this disclosure, a personal data device is a handheld logical device that is used for managing personal information and communication. Examples of personal data device include, but are not limited to, cellular phones, tablets, smartphones, and computers.

Plug: As used in this disclosure, a plug is an electrical termination that electrically connects a first electrical circuit to a second electrical circuit or a source of electricity. As used in this disclosure, a plug will have two or three metal pins.

Port: As used in this disclosure, a port is an electrical termination that is used to connect a first electrical circuit to a second external electrical circuit. In this disclosure, the port is designed to receive a plug.

Protected Space: As used in this disclosure, a protected space is a negative space within which an object is stored. The protected space is enclosed by a barrier structure that: a) prevents damage to the object contained within the protected space; b) maintains conditions that are appropriate for the object; c) protects the object within the protected space from potential dangers that are outside of the protected space; or, d) maintains the privacy of the object within the protected space.

Sensor: As used in this disclosure, a sensor is a device that receives and responds in a predetermined way to a signal or stimulus. As further used in this disclosure, a threshold sensor is a sensor that generates a signal that indicates whether the signal or stimulus is above or below a given threshold for the signal or stimulus.

Tissue: As used in this disclosure, a tissue refers to a structure within a biological entity, commonly an animal. The tissue is an aggregation of specialized cells that performs a specific function within the biological entity. An organ is formed from a plurality of tissues. The tissues contained in the plurality of tissues of an organ often perform different functions.

USB: As used in this disclosure, USB is an acronym for Universal Serial Bus which is an industry standard that defines the cables, the connectors, the communication protocols and the distribution of power required for interconnections between electronic devices. The USB standard defines several connectors including, but not limited to, USB-A, USB-B, mini-USB, and micro USB connectors. A USB cable refers to a cable that: 1) is terminated with USB connectors; and, 2) that meets the data transmission standards of the USB standard.

WiFi™: As used in this disclosure, WiFi™ refers to the physical implementation of a collection of wireless electronic communication standards commonly referred to as IEEE 802.11x.

Wireless: As used in this disclosure, wireless is an adjective that is used to describe a communication link between two devices that does not require the use of physical cabling.

Wireless Communication Link: As used in this disclosure, a wireless communication link is a previously determined channel that is used to wirelessly exchange information between one or more transceivers.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A pet collar with potty-sensing capability comprising
   wherein the pet collar with potty-sensing capability comprises a collar and a control circuit;
   wherein the control circuit mounts in the collar.

2. The pet collar with potty-sensing capability according to claim 1
   wherein the pet collar with potty-sensing capability is adapted for use by a companion animal;
   wherein the pet collar with potty-sensing capability is worn by the companion animal;
   wherein the pet collar with potty-sensing capability detects the heart rate of the companion animal;
   wherein the pet collar with potty-sensing capability detects the electric activity of the nervous system associated with the detrusor muscle of the companion animal;
   wherein the pet collar with potty-sensing capability identifies known correlations between: a) the heart rate of the companion animal; b) the electric activity associated with the detrusor muscle; and, c) the urgency of the need of the companion animal to urinate;
   wherein the pet collar with potty-sensing capability generates an alarm condition to indicate that the companion animal needs to urinate;
   wherein in response to the alarm condition, the pet collar with potty-sensing capability will: a) generate a visible alarm on the animal; and, b) transmit a messaging facility to an appropriate authority with an alarm message.

3. The pet collar with potty-sensing capability according to claim 2
   wherein the collar is a strap;
   wherein the collar is worn as a collar by the companion animal;
   wherein the control circuit mounts in the collar;
   wherein the collar further comprises a buckle;
   wherein the buckle is a fastening device;
   wherein the buckle secures the collar to itself to form a loop;
   wherein the buckle secures the collar to the neck of the companion animal;
   wherein the buckle is formed with a negative space;
   wherein the negative space of the buckle forms a protected space that houses the control circuit.

4. The pet collar with potty-sensing capability according to claim 3
   wherein the control circuit is an electric circuit;

wherein the control circuit controls the operation of the pet collar with potty-sensing capability;

wherein the control circuit measures the heart rate of the companion animal;

wherein the control circuit measures the electric activity of the nervous system associated with the detrusor muscle of the companion animal;

wherein the control circuit monitors the measured heart rate and the measured electric activity to identify and determine the urgency of the need of the companion animal to urinate;

wherein the control circuit generates a visual alarm when the control circuit determines that the companion animal needs to urinate;

wherein the control circuit transmits a messaging facility containing the alarm message to the appropriate authority when the control circuit determines that the companion animal needs to urinate.

5. The pet collar with potty-sensing capability according to claim 4 wherein the control circuit is an independently powered electric circuit;

wherein by independently powered is meant that the control circuit can operate without an electrical connection to an external power source.

6. The pet collar with potty-sensing capability according to claim 5 wherein the control circuit comprises a logic module, a communication module, a plurality of sensors, a lamp circuit, and a power circuit;

wherein the logic module, the communication module, the plurality of sensors, the lamp circuit, and the power circuit are electrically interconnected.

7. The pet collar with potty-sensing capability according to claim 6 wherein the logic module is a programmable electronic device;

wherein the communication module further comprises a first wireless communication link and a personal data device;

wherein the communication module forms the first wireless communication link with the personal data device;

wherein the communication module exchanges one or more direct messaging facilities that are transmitted over the first wireless communication link to the personal data device;

wherein the message contained in the direct messaging facility contains the alarm message intended to inform the appropriate authority that the companion animal needs to urinate.

8. The pet collar with potty-sensing capability according to claim 7 wherein the logic module electrically connects to each sensor selected from the plurality of sensors;

wherein the logic module monitors and analyzes the heart rate data and the electrical activity data collected by the plurality of sensors;

wherein the logic module performs the analysis of the collected data to determine whether the companion animal needs to urinate;

wherein the logic module electrically connects to the lamp circuit;

wherein the logic module controls the operation of the lamp circuit;

wherein the logic module illuminates the lamp circuit when the logic module determines that the companion animal needs to urinate.

9. The pet collar with potty-sensing capability according to claim 8 wherein each senor selected from the plurality of sensors measures a biological process selected from the group consisting of: a) the heart rate of the companion animal; and, b) the action potentials that form the electric activity of the nervous system associated with the detrusor muscle of the companion animal;

wherein the plurality of sensors transmits the measured heart rate information to the logic module;

wherein the plurality of sensors transmits the measured electrical activity information to the logic module.

10. The pet collar with potty-sensing capability according to claim 9 wherein the plurality of sensors mounts on the interior face of the collar such that each sensor selected from the plurality of sensors is in contact with the skin of the companion animal.

11. The pet collar with potty-sensing capability according to claim 10 wherein the plurality of sensors comprises a heart rate sensor and a plurality of electrodes;

wherein the heart rate sensor is a heart sensor;

wherein the heart rate sensor detects and measures the heart rate of the companion animal;

wherein the heart rate sensor converts the measured heart rate into an electric signal;

wherein the heart rate sensor transmits the electric signal to the logic module for further processing;

wherein the plurality of electrodes is formed from a collection of individual electrodes;

wherein the plurality of electrodes measure the action potentials that form the electric activity of the nervous system associated with the detrusor muscle of the companion animal;

wherein the plurality of electrodes converts the measured action potentials into an electric signal;

wherein the plurality of electrodes transmit the electric signal to the logic module for further processing.

12. The pet collar with potty-sensing capability according to claim 11 wherein the lamp circuit is an electric circuit;

wherein the lamp circuit converts electric energy into electromagnetic radiation;

wherein the lamp circuit mounts on the exterior face of the collar such that the electromagnetic radiation generated by the lamp circuit is visible from the environment;

wherein the lamp circuit electrically connects to the logic module;

wherein the logic module illuminates the lamp circuit when the logic module determines that the companion animal needs to urinate.

13. The pet collar with potty-sensing capability according to claim 12 wherein the power circuit is an electrical circuit;

wherein the power circuit powers the operation of the control circuit;

wherein the power circuit is an electrochemical device;

wherein the power circuit converts chemical potential energy into the electrical energy required to power the control circuit.

* * * * *